(12) United States Patent
Keates

(10) Patent No.: US 10,381,678 B2
(45) Date of Patent: Aug. 13, 2019

(54) COMPRESSED LI-METAL BATTERY

(71) Applicant: INTEL CORPORATION, Santa Clara, CA (US)

(72) Inventor: Andrew W. Keates, Los Gatos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 306 days.

(21) Appl. No.: 15/372,681

(22) Filed: Dec. 8, 2016

(65) Prior Publication Data

US 2018/0006323 A1 Jan. 4, 2018

Related U.S. Application Data

(60) Provisional application No. 62/357,544, filed on Jul. 1, 2016.

(51) Int. Cl.
| | |
|---|---|
| *H01M 10/04* | (2006.01) |
| *H01M 10/0585* | (2010.01) |
| *H01M 10/42* | (2006.01) |
| *H01M 10/48* | (2006.01) |
| *H01M 2/20* | (2006.01) |
| *H01M 10/0525* | (2010.01) |
| *H01M 4/134* | (2010.01) |

(Continued)

(52) U.S. Cl.
CPC ....... *H01M 10/0468* (2013.01); *H01M 2/204* (2013.01); *H01M 4/134* (2013.01); *H01M 4/382* (2013.01); *H01M 10/0436* (2013.01); *H01M 10/052* (2013.01); *H01M 10/0525* (2013.01); *H01M 10/0585* (2013.01); *H01M 10/425* (2013.01); *H01M 10/48* (2013.01); *H01M 2010/4278* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 6,087,036 | A * | 7/2000 | Rouillard | H01M 2/202 429/120 |
| 8,460,819 | B2 * | 6/2013 | Fredriksson | H01M 2/10 429/100 |

(Continued)

FOREIGN PATENT DOCUMENTS

| | | |
|---|---|---|
| CN | 103943885 A | 7/2014 |
| CN | 104934660 A | 9/2015 |
| WO | 2016036184 A1 | 3/2016 |

OTHER PUBLICATIONS

PCT/US2017/034264, International Search Report and Written Opinion, dated Aug. 21, 2017, 11 pages.

*Primary Examiner* — Rena Dye Cronin
(74) *Attorney, Agent, or Firm* — Stoel Rives LLP

(57) ABSTRACT

A new battery cell structure uses a reduced stack pressure force to be used and applied over a much smaller area of the cells by using the sides of the cell instead of the top and bottom of the cell. To reduce the amount of force required to compress a cell, an edge-wise construction can be used instead of the sheet construction. Instead of stack pressure having to be applied to the top and bottom of the cell, it is now applied across the edges. An edge-on design is used to form strips, which allows for flat sides of a battery body.

23 Claims, 7 Drawing Sheets

(51) Int. Cl.
*H01M 4/38* (2006.01)
*H01M 10/052* (2010.01)

(56) References Cited

U.S. PATENT DOCUMENTS

| | | | | |
|---|---|---|---|---|
| 2003/0194605 | A1* | 10/2003 | Fauteux | H01M 2/26 429/149 |
| 2005/0118504 | A1* | 6/2005 | Honda | H01M 4/0426 429/218.1 |
| 2007/0042264 | A1* | 2/2007 | Desilvestro | H01M 2/08 429/152 |
| 2012/0156537 | A1* | 6/2012 | Meintschel | B60L 11/1874 429/99 |
| 2012/0183832 | A1* | 7/2012 | Culver | H01M 2/24 429/120 |
| 2012/0308864 | A1* | 12/2012 | Meintschel | H01M 8/0273 429/96 |
| 2013/0109371 | A1 | 5/2013 | Brogan et al. | |
| 2014/0093760 | A1 | 4/2014 | Hermann et al. | |
| 2014/0186685 | A1* | 7/2014 | Kwon | H01M 2/18 429/160 |

* cited by examiner

COMPRESSED LI-METAL BATTERY

RELATED APPLICATION

This application claims the benefit under 35 U.S.C. § 119(e) of U.S. Provisional Application No. 62/357,544 filed Jul. 1, 2016, which is incorporated by reference herein in its entirety.

TECHNICAL FIELD

The present disclosure relates to batteries and more specifically to an edge-wise construction of a lithium metal battery.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a new battery cell structure for a reduced stack pressure force to be used and applied over a much smaller area of the cells by using the sides of the cell instead of the top and bottom of the cell. To reduce the amount of force to compress a cell, an edge-wise construction can be used instead of the sheet construction. Instead of stack pressure having to be applied to the top and bottom of the cell, it is now applied across the edges, resulting in a reduced force to compress the cell. An edge-on design is used to form strips.

An anode for a Li-ion battery can be Lithium in its metallic form. This can increase the energy density of cells by about 20% compared to conventional graphitic anodes. Li-metal anodes have not been selected for use for at least a few reasons. These reasons include (1) dendrite formation and (2) stack pressure.

Figure 1:
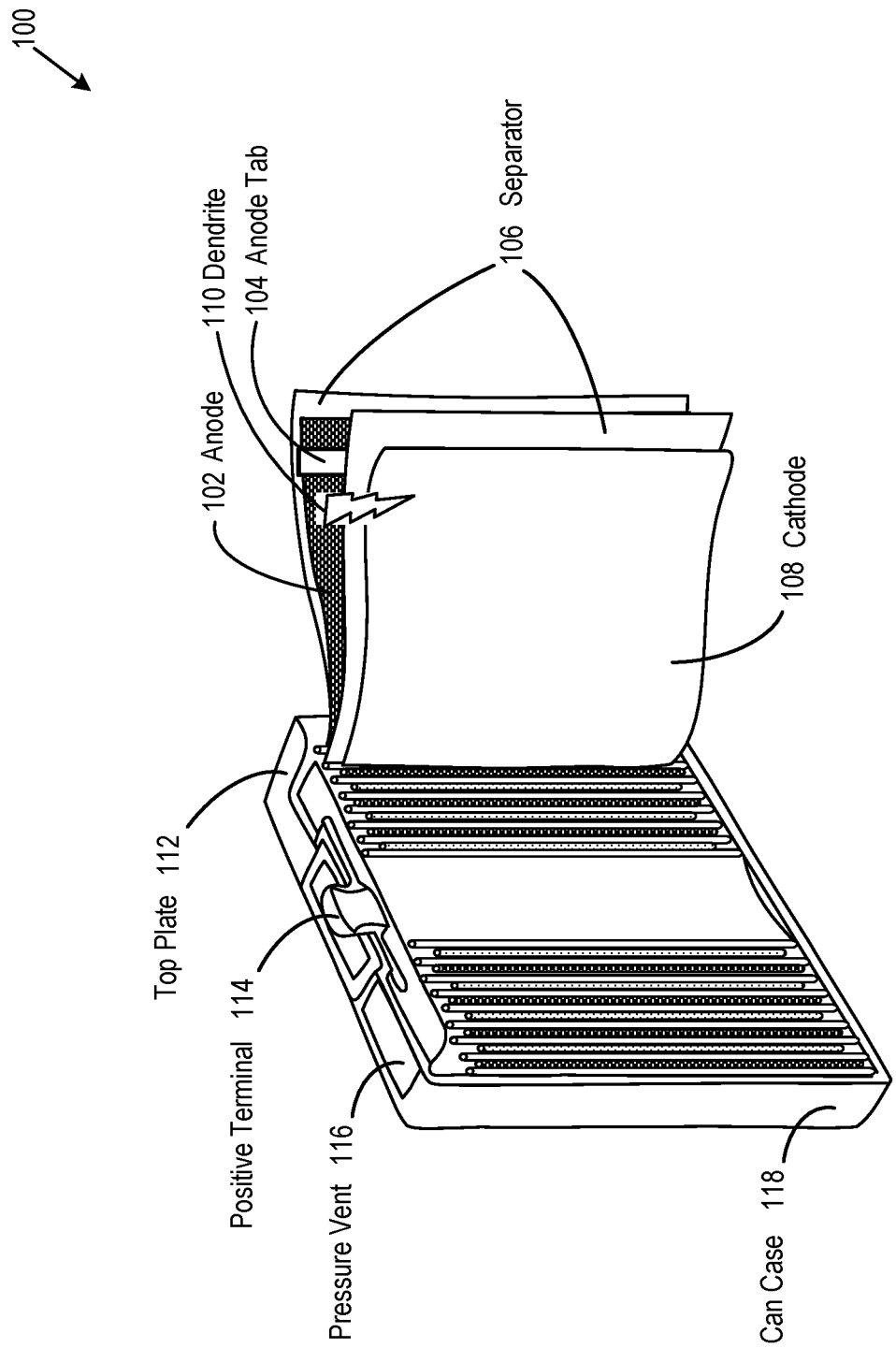
FIG. 1 is a diagram illustrating a Lithium-Metal (Li-Metal) battery with a dendrite consistent with embodiments disclosed herein.

FIG. 1 shows a Lithium-Metal (Li-Metal) battery 100 with a dendrite 110. The battery 100 is formed from a set of layers that include an anode 102 separated from a cathode 108 by a separator 106. These layers can be stacked, such as by wrapping around a central area. When wrapping, a second separator 106 can be used. The anode 102 can include an anode tab 104 that joins anode current collectors and provides an electrical connection to a negative terminal (not shown) of a can case 118. A top plate 112 can seal the layers inside the can case 118. The top plate 112 can include a positive terminal 114 and a pressure vent 116. The positive terminal 114 can be electrically coupled to one or more cathode layers 108. The pressure vent 116 can be provided to provide a pressure exit due to pressure build-up beyond a threshold value (such as in the case of a catastrophic failure).

With regard to (1) dendrite 110 formation, when the battery 100 is charged, the lithium is not deposited on the anode 102 as a uniform metal film. The lithium forms as granules. Each of these granules becomes coated with a passivation layer, called a "surface electrolyte interphase" (SEI) layer. As the grains swell, this layer 102 cracks. Lithium that deposits in the crack can eventually cause a growth called a dendrite 110 as repeated crack/repair events occur. Such a dendrite 110, in rare cases, will grow long enough to pierce the separator 106 and short circuit the anode 102 and the cathode 108, potentially causing a catastrophic battery failure.

With regard to (2) stack pressure, without stack pressure the Li granules deposited at the anode 102 during battery charging may become disassociated with each other, not all touching each other and not touching a copper foil current collector which conducts electrons out of the battery 100 via the negative terminal. Disconnected, these granules are no longer part of the charge/discharge process. Stack pressure of 50 to 150 PSI applied to the sides of the battery 100 may be used to hold the granules together. This is achievable in a cylindrical cell, which can withhold pressure in the cylinder, but can be difficult in a flat cell (as shown in FIG. 1), where the flat sides would bulge and not hold the anode particles (granules) in place.

This disclosure focuses on (2) stack pressure. A new battery cell structure enables a reduced stack pressure force to be used and applied over a much smaller area of the cells, namely, the sides of the cell instead of the top/bottom of the cell. The application of stack pressure, which has, to date, been less practical for flat cells, is made more practical by a cell design that uses less force to achieve a similar pressure.

It should be noted that the embodiments of proposed cell construction can also improve energy density of the cells because the cell contains pressure better than an alternative (such as sheet construction or cylindrical cell). In addition, less of the cell is used for current collector layers, since each current collector can be constructed thinner than in a regular cell alternative. Further, the cell can better arrest thermal runaway than a regular cell alternative, increasing safety of the cells.

Figure 2:
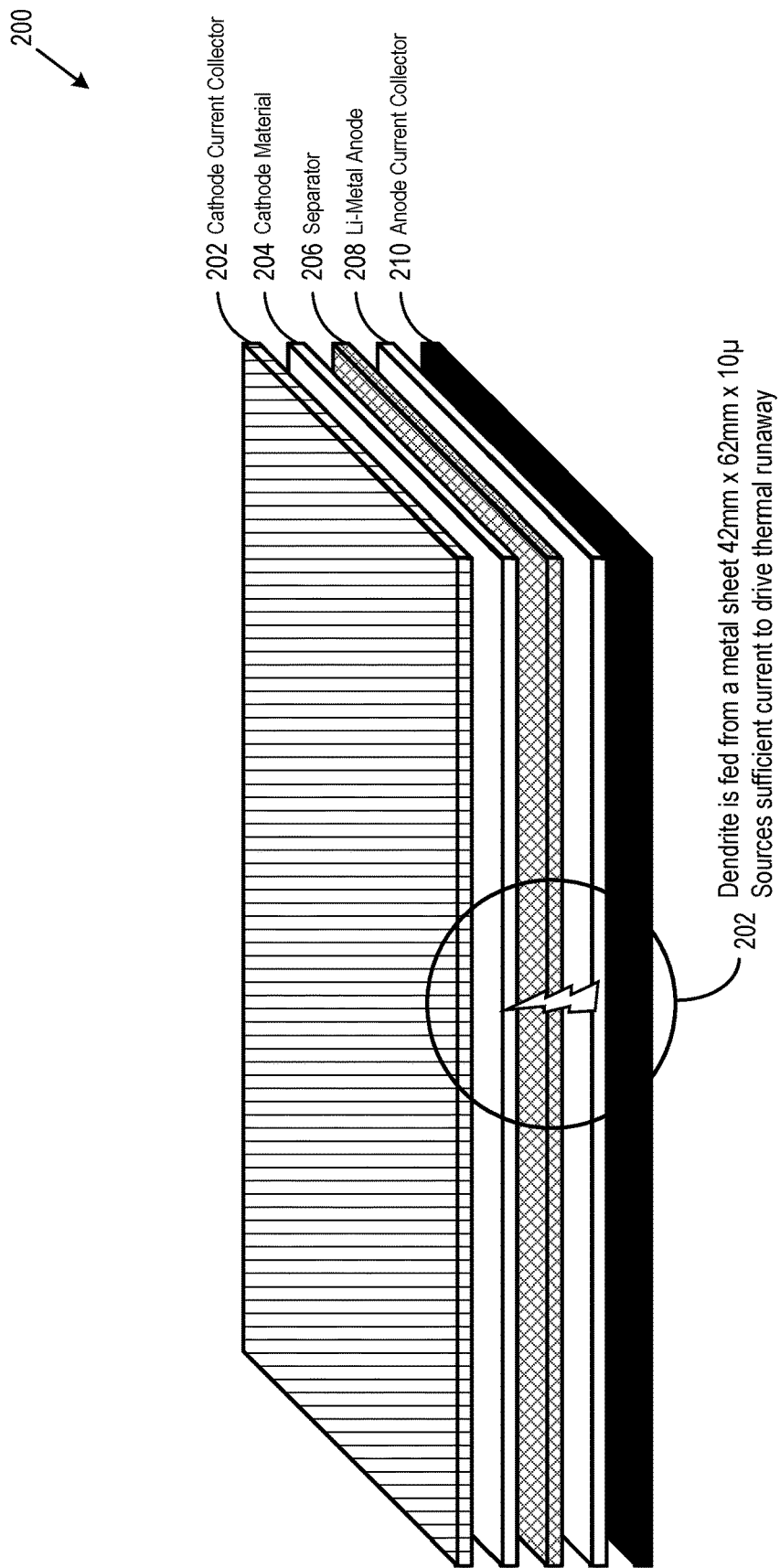
FIG. 2 is a diagram illustrating a Li-Metal battery system with sheets consistent with embodiments disclosed herein.
Figure 3:
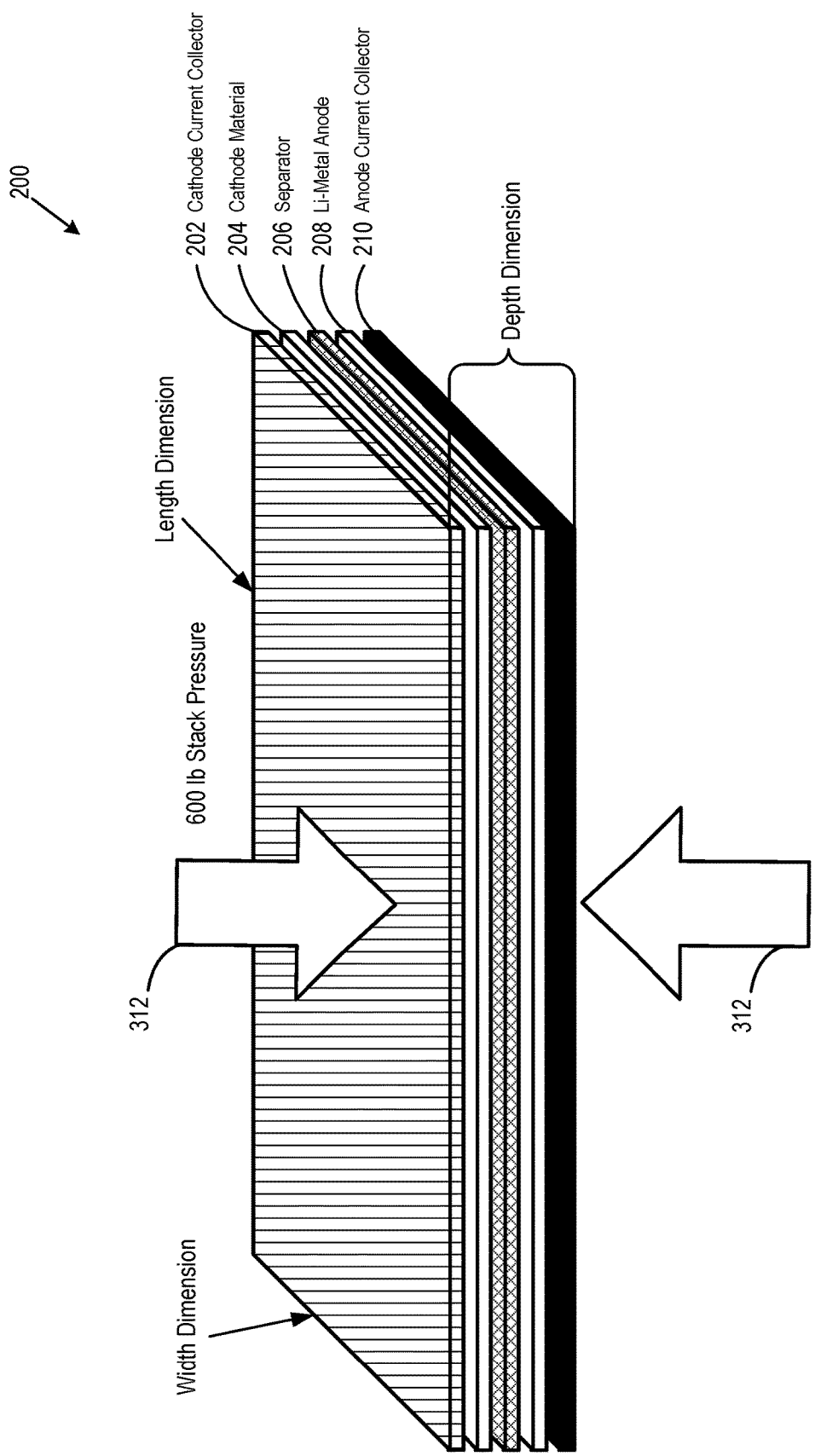
FIG. 3 is a diagram illustrating pressure for a Li-Metal battery system with sheets consistent with embodiments disclosed herein.

FIGS. 2-3 show a battery formed from a stack of sheets using a sheet construction. In FIG. 2, each sheet is approximately 42 mm by 62 mm by 10 μm. The sheets include one or more cathode current collectors 202, one or more cathode material 204, one or more separators 206, one or more Li-Metal anodes 208 and one or more anode current collectors 210. The current collectors 202, 210 function to collect and transfer charge to or from the anode 208 or cathode material 204. The material layers 204, 208 function to create charge. The separator 206 functions to keep the cathode material 204 separated from the anode material 208. In one embodiment, the separator is a little wider than then the anode and cathode layers for manufacturing tolerance and a possibility that the separator might shrink during use. While the layers are not the same size, they layers are approximately the same size.

A dendrite that forms between the anode (208 and/or 210) and the cathode (204 and/or 202) can cause a short circuit, and potentially a large amount of current between the anode (208 and/or 210) and the cathode (204 and/or 202). This current can drive thermal runaway. This thermal runaway can cause gas formation and/or an explosion.

For example, in FIG. 3, a cell-phone battery may measure 42 mm×62 mm×5 mm. In a regular cell, the area of plates (202, 204, 206, 208, 210) is 42 mm×62 mm=2,604 $mm^2$, or 4 square inches. This means that for 150 PSI, 600 lbs of pressure 312 is required. A large, rigid flat plate would need to compress the cell with 600 lbs of force.

Figure 4:
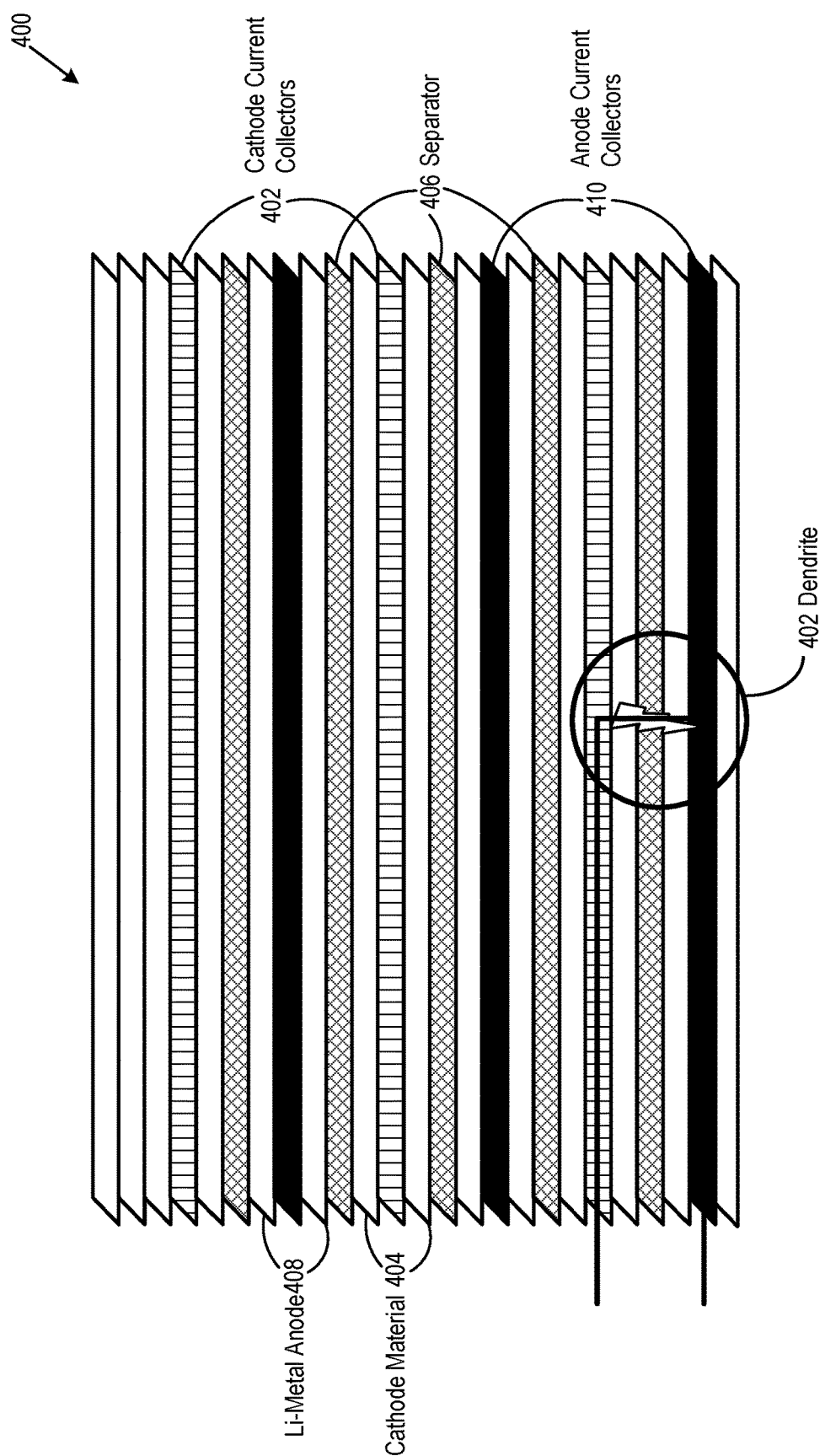
FIG. 4 is a diagram illustrating a Li-Metal battery system with strips consistent with embodiments disclosed herein.
Figure 5:
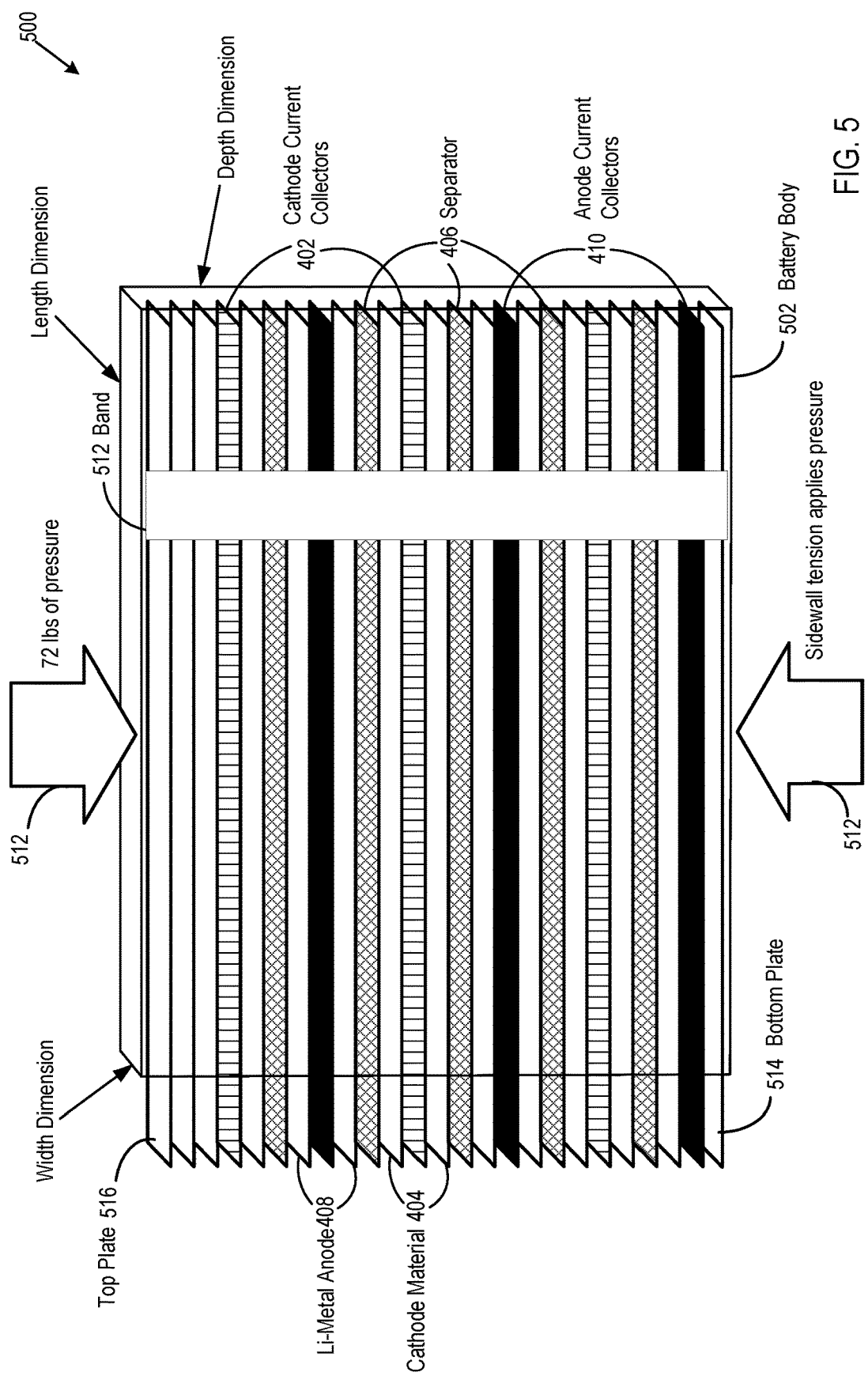
FIG. 5 is a diagram illustrating pressure for a Li-Metal battery system with strips consistent with embodiments disclosed herein.

FIGS. 4-5 show a battery 400 and 500 formed with an edge-wise construction using strips. To reduce the amount of force required to compress a cell, an edge-wise construction can be used instead of the sheet construction. Instead of stack pressure having to be applied to the top/bottom of the cell, it is now applied across the edges (as seen in FIG. 5). In FIG. 4, an edge-on design is used to form strips 402, 404, 406, 408, and 410. An area of side edges is 5 mm×62 mm=310 $mm^2$, or 0.48 square inches. FIG. 5 shows that for 150 PSI, 72 lbs of pressure is required for the strips. This 72 lbs of pressure is more practical than the 600 lbs of force for the sheet construction shown in FIGS. 3-4. This 72 lbs of force can be provided by structures such as bands 512 around the battery 500 holding rigid end plates 514 and 516 at either end. A set of strips 402, 404, 406, 408, and 410 can be inserted into a battery body 502 and electrolyte can be disposed in the battery body and between the set of strips 402, 404, 406, 408, and 410. In cases where a lesser stack pressure is required, the rigidity of the battery cell package may be sufficient to exert the necessary pressure. In one embodiment, a rigid edge plate has a semi-circular cross section, wherein a flat side of the semi-circular cross section of the first edge plate is configured to compress the one or more sets of layers, and wherein the semicircular side is configured to face (and/or slide against) the battery body.

In this design, the sidewall skins of a battery body 502 of a battery cell can hold the end plates 514 and 516 in place by applying tension to the end-stops that keep the narrow layers 402, 404, 406, 408, and 410 compressed. Much less pressure can be used than batteries such as those shown in FIGS. 2-3. Instead of compensating for bulge across a 42 mm cell width, end-stops can contain it over a 5 mm width at the cell sides, requiring less substantial end plates 514 and 516 than a top/bottom compression scenario.

Individual collector strips 402, 410 can be coupled together to form a bus. In some embodiments, A set of anode collector strips can extend beyond a main portion of the battery and be welded together to form an anode bus on a first side of the battery. A set of cathode collector strips can also extend beyond a main portion of the battery and be welded together to form an cathode bus on a second side of the battery.

Deposited Li-metal granules, absent the 600 lbs of pressure, can cause a regular cell to bulge and the granules would become disassociated from each other. In the edge-on design, rigid end-plates apply a lesser force to maintain the same stack pressure and the top and bottom battery cell skins are put under tension, keeping the cell flat.

Figure 6:
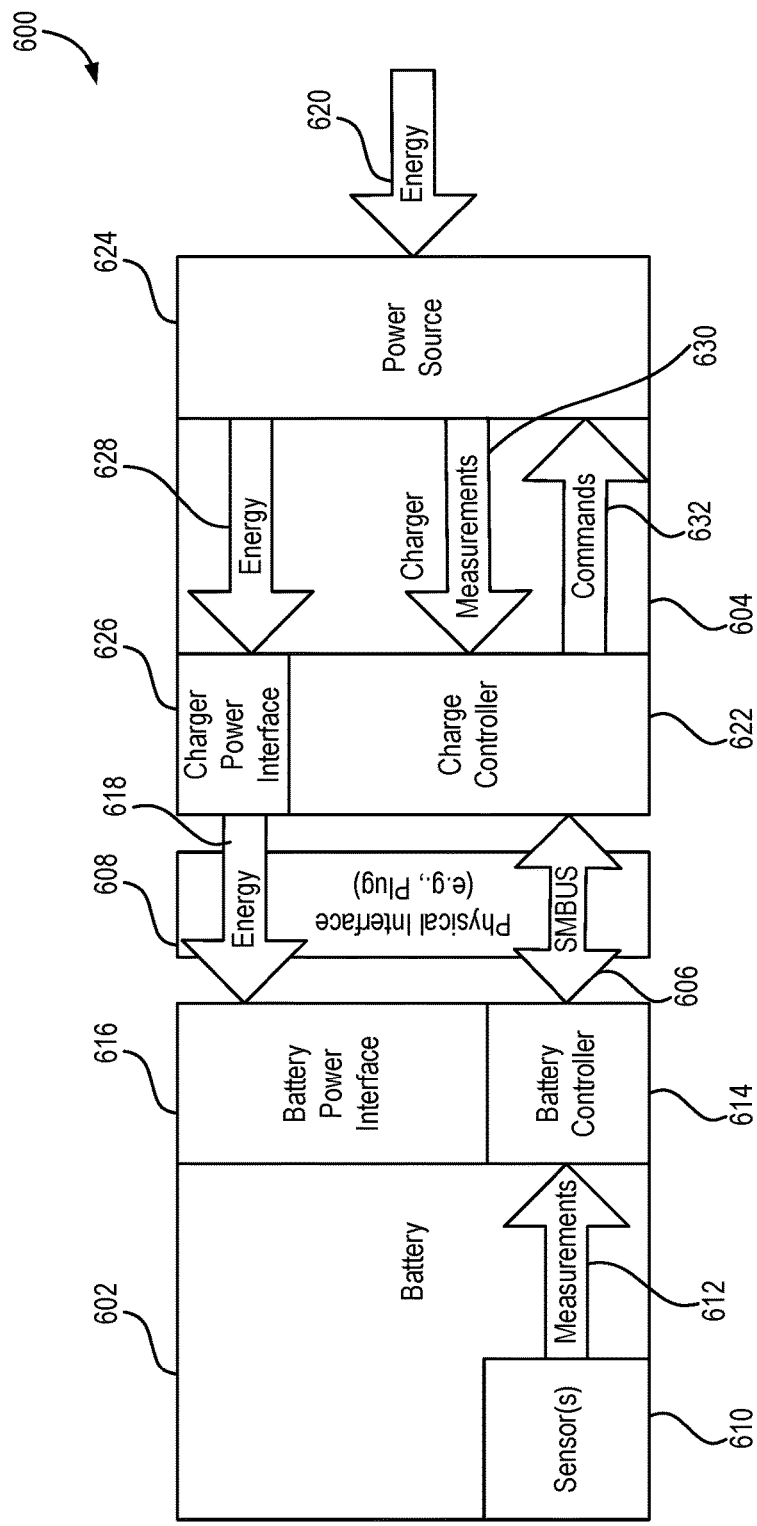
FIG. 6 is a schematic diagram of a battery system consistent with embodiments disclosed herein.

FIG. 6 shows a diagram 600 of a battery 602 connected to a charger 604 through a physical interface 608 using an SMBUS 606 for communication. The battery 602 can include sensors 610, a battery power interface 616 and a battery controller 614. The sensors 610 can measure aspects of the battery 602, such as impedance, open circuit voltage (OCV), charge current, charge voltage, etc. The battery power interface 616 can receive energy 618 over the physical interface 608 from the charger 604 and provide the energy 618 to the battery 602. The battery power interface 616 can also include safety features that prevent damage to the battery 602 (e.g., overvoltage protection, thermal shutdown, etc.). The battery controller 614 can receive measurements 612 from the sensors 610 and communicate with the charger 604 over a control channel such as the SMBUS 606. The battery controller 614 can also include stored information such as creation date of the battery 602, number of charge cycles, tables of cutoff thresholds, tables of charge state based on impedance, charge state equations, charge state equation constants, original OCV of the battery 602, original charge time of the battery 602, original impedance of the battery 602, etc.

The charger 604 can include a charge controller 622, a power source 624 and a charger power interface 626. The charge controller 622 can receive messages over a control channel (such as the SMBUS 606 or I2C (inter-integrated circuit bus), etc.), configure the power source 624 (such as through commands 632) and receive measurements 630. The power source 624 can provide energy 628 to be delivered to and/or charge the battery 602. The power source 624 can be configured by the charge controller 622, including configurations such as constant current and/or constant voltage settings. The power source 624 can provide the measurements 630 to the charge controller 622, such as voltage, current, impedance and power information including measurements and/or estimates. The power source 624 can receive input energy 620 (such as from an AC adapter or wall outlet) to convert into the energy 628 to charge the battery 602. The charger power interface 626 can couple the energy 628 from the power source 624 to the battery power interface 616. The charger 604 (such as the charger power interface 626, etc.) can include safety features (e.g., overvoltage, thermal and/or power protection).

The battery controller 614 can send messages that cause the charger 604 (by way of the charge controller 622) to perform actions. For example, the battery controller 614 can send a message using an SMBUS protocol to the charge controller 622 which causes the charge controller 622 to modify charging settings of the power source 624 that provides the energy 618 to the battery 602 over the charger power interface 626 to the battery power interface 616 via the physical interface 608. The battery controller 614 can send messages to the charge controller 622 to request a constant current charge at a specified constant current value, a constant voltage charge at a specified constant voltage value, that charging stop at a specified cutoff current threshold, that charging stop at a specified voltage cutoff threshold, that charging stop at a specified cutoff impedance threshold, etc. In addition, the battery controller 614 can send messages to the charge controller 622 to enqueue a series of actions with specified thresholds to cause a transition from one action to another action in the queue. In other embodiments, the charge controller 622 can perform the same or similar tasks.

In some embodiments, the battery controller 614 can communicate with the charge controller 622 to cause a series of constant current step charges. The battery controller 614 can send a series of messages to the charge controller 622 to dynamically alter constant current step charges.

It should be recognized that FIG. 6 represents an embodiment, but that elements of the systems can be located and/or combined differently. For example, the sensors 610 can be located in the charger 604 with measurements of the battery 602 occurring across the physical interface 608. Other combinations are also possible.

Depending on the embodiment, the charging instructions can reside in software, firmware and/or circuits of the charge controller 622. Embodiments described herein can also be integrated in systems on chips (SoCs) with integrated chargers, power management integrated circuits (PMICs) with integrated chargers, etc.

Figure 7:
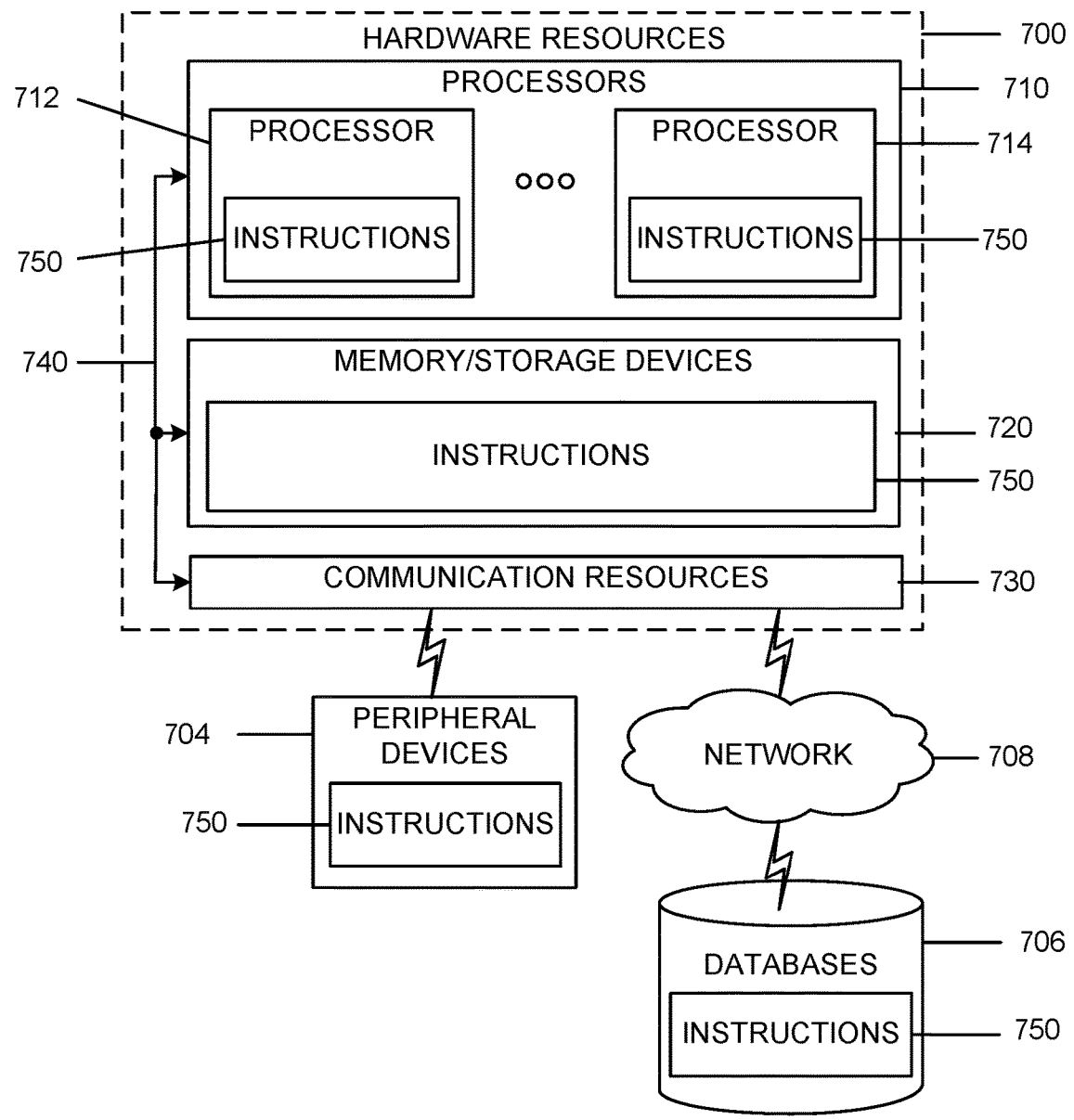
FIG. 7 is a block diagram illustrating a computing system and components consistent with embodiments disclosed herein.

FIG. 7 is a block diagram illustrating components, according to some example embodiments, able to read instructions from a machine-readable or computer-readable medium (e.g., a machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which are communicatively coupled via a bus 740.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714. The memory/storage devices 720 may include main memory, disk storage, or any suitable combination thereof.

The communication resources 730 may include interconnection and/or network interface components or other suitable devices to communicate with one or more peripheral devices 704 and/or one or more databases 706 via a network 708. For example, the communication resources 730 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 and/or the databases 706. Accordingly, the memory of processors 710, the memory/storage devices 720, the peripheral devices 704, and the databases 706 are examples of computer-readable and machine-readable media.

Examples

The following examples pertain to further embodiments.

Example 1 is a battery. The battery uses reduced stack force and edge-wise construction, including a first edge plate having substantially a length and substantially a width, and a second edge plate having substantially the length and substantially the width. The battery further includes one or more sets of layers compressed with pressure between the first edge plate and the second edge plate. The sets of layers having substantially the length and substantially the width, a set of layers from the one or more sets of layers including a cathode current collector layer, and a cathode material layer coupled to the cathode current collector layer. The sets of layers having substantially the length and substantially the width, a set of layers from the one or more sets of layers including an anode current collector layer, a Lithium-metal layer coupled to the anode current collector layer and including Lithium metal, and a separator layer disposed between the Lithium-metal layer and the cathode material layer and designed to insulate the cathode material layer from the Lithium-metal layer. The sets of layers having substantially the length and substantially the width, a set of layers from the one or more sets of layers including a battery body having the length, the width and a depth, where an edge of the battery is defined by the length and the width of the one or more sets of layers within the battery; a side of the battery is defined by the length and the depth of the one or more sets of layers within the battery, and where an edge area of the battery body is larger than a side area of the battery body.

Example 2 is the battery of Example 1, where the battery body has substantially flat sides.

Example 3 is the battery of Example 1, where the first edge plate has a semi-circular cross section, where a flat side of the semi-circular cross section of the first edge plate is designed to compress the one or more sets of layers, and where the semicircular side is designed to face the battery body.

Example 4 is the battery of Example 1, where the battery body is further designed to provide the pressure to the first edge plate and the second edge plate.

Example 5 is the battery of Example 1, further including one or more bands to provide pressure to the plates.

Example 6 is the battery of Example 1, further including a positive terminal coupled to one or more cathode collector layers and a negative terminal coupled to one or more anode collector layers.

Example 7 is the battery of Example 1, further including an electrolyte disposed between the layers.

Example 8 is the battery of Example 1, where the edgewise construction provides greater energy density than sheet construction or cylinder construction by enabling thinner layers or more pressure.

Example 9 is a method of constructing a battery. The method includes providing a first edge plate having substantially the length and substantially the width, and providing a second edge plate having substantially the length and substantially the width. The batter also includes disposing one or more sets of layers between the first edge plate and second edge plate. The sets of layers having substantially the length and substantially the width, a set of layers from the one or more sets of layers including; a cathode current collector layer, a cathode material layer coupled to the cathode current collector layer. The sets of layers also include an anode current collector layer, a Lithium-metal layer coupled to the anode current collector layer and including Lithium metal, and a separator layer disposed between the Lithium-metal layer and the cathode material layer and designed to insulate the cathode material layer from the Lithium-metal layer. The sets of layers also include compressing the layers between the first edge plate and the second edge plate to a force threshold or a pressure threshold, and where a combined depth of the first edge plate, second edge plate and the set of layers is larger than the length and the width.

Example 10 is the method of Example 9, where the cathode current collector layer is between two cathode material layers.

Example 11 is the method of Example 9, where the anode current collector layer is between two Lithium-metal layers.

Example 12 is the method of Example 9, where the one or more sets of layers further comprise at least two sets of layers with an additional separator between the layers.

Example 13 is the method of Example 9, where the one or more sets of layers further include at least two sets of layers, where the layer order is a first cathode set of layers including a first cathode material layer, a first cathode current collector layer, a second cathode material layer, and a first separator layer. The layer order also includes a first anode set of layers include a first Lithium-metal layer, a first anode current collector layer, a second Lithium-metal layer, a second separator layer, a second cathode set of layers, a third separator layer, and a second anode set of layers.

Example 14 is the method of Example 9, further including inserting the set of layers, first edge plate and second plate within a battery body.

Example 15 is the method of Example 14, further including disposing an electrolyte in the battery body.

Example 16 is the method of Example 9, further including placing one or more bands around the compressed layers, first edge plate and the second edge plate.

Example 17 is the method of Example 9, where the one or more sets of layers further includes alternating cathode layer sets and anode layer sets. The cathode layer sets include the cathode current collector layer between cathode material layers, and the anode layer sets include the anode current collector layer between Lithium-metal layers.

Example 18 is a computing device. The computing device includes a processor mounted on a substrate, a memory unit capable of storing data, a graphics processing unit, and an antenna within the computing device. The computing device also includes a display on the computing device, a battery within the computing device, and a power amplifier within the processor. The computing device also includes voltage regulator within the processor where the battery includes a battery body having a length, width and depth, where the depth is larger than the length and width, a first edge plate having substantially the length and substantially the width, and a second edge plate having substantially the length and substantially the width. The battery also includes one or more sets of strips compressed with pressure between the first edge plate and the second edge plate, the sets of strips having substantially the length and substantially the width, a set of strips from the one or more sets of strips including a cathode current collector strip, a cathode material strip coupled to the cathode current collector strip, an anode current collector strip, and a Lithium-metal strip coupled to the anode current collector strip and including Lithium metal. The set of strips also includes a separator strip disposed between the Lithium-metal strip and the cathode material strip and designed to insulate the cathode material strip from the Lithium-metal strip, where a combined depth of the first edge plate, second edge plate and the set of strips is larger than the length and the width, and where the first edge plate, second edge plate and one or more sets of strips are inserted within the battery body.

Example 19 is the computing device of Example 18, further including a charging sensor.

Example 20 is the computing device of Example 18, further including an anode collector bus coupled to the anode current collector strip.

Example 21 is the computing device of Example 20, where the anode collector bus is coupled to a negative terminal.

Example 22 is the computing device of Example 18, further including a cathode collector bus coupled to the cathode current collector strip.

Example 23 is the computing device of Example 22, where the cathode collector bus is coupled to a negative terminal.

Example 24 is the computing device of Example 18, where the battery has flat edges and sides.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A battery using reduced stack force and edge-wise construction, comprising:
   a first edge plate having substantially a length and substantially a width;
   a second edge plate having substantially the length and substantially the width;
   one or more sets of layers compressed with pressure between the first edge plate and the second edge plate, the sets of layers having substantially the length and substantially the width, a set of layers from the one or more sets of layers comprising:
      a cathode current collector layer;
      a cathode material layer coupled to the cathode current collector layer;
      an anode current collector layer;
      a lithium-metal layer coupled to the anode current collector layer and comprising lithium metal; and
      a separator layer disposed between the lithium-metal layer and the cathode material layer and configured to insulate the cathode material layer from the lithium-metal layer; and
   a battery body having the length, the width and a depth, wherein:
      an edge area of the battery is defined by the length times the width of the one or more sets of layers within the battery; and
      a side area of the battery is defined by the length times the depth of the one or more sets of layers within the battery,
      wherein the side area of the battery body is larger than the edge area of the battery body.

2. The battery of claim 1, wherein the battery body has substantially flat sides.

3. The battery of claim 1, wherein the battery body is further configured to provide the pressure to the first edge plate and the second edge plate.

4. The battery of claim 1, further comprising one or more bands to provide pressure to the plates.

5. The battery of claim 1, further comprising a positive terminal coupled to one or more cathode collector layers and a negative terminal coupled to one or more anode collector layers.

6. The battery of claim 1, further comprising an electrolyte disposed between the layers.

7. The battery of claim 1, wherein the edge-wise construction provides greater energy density than sheet construction or cylinder construction by enabling thinner layers or more pressure.

8. A method of constructing a battery, comprising:
   providing a first edge plate having substantially the length and substantially the width;
   providing a second edge plate having substantially the length and substantially the width;
   disposing one or more sets of layers between the first edge plate and second edge plate, the sets of layers having substantially the length and substantially the width, a set of layers from the one or more sets of layers comprising:
      a cathode current collector layer;
      a cathode material layer coupled to the cathode current collector layer;
      an anode current collector layer;
      a lithium-metal layer coupled to the anode current collector layer and comprising lithium metal; and
      a separator layer disposed between the lithium-metal layer and the cathode material layer and configured to insulate the cathode material layer from the lithium-metal layer; and
   compressing the layers between the first edge plate and the second edge plate to a force threshold or a pressure threshold,
   wherein a side area comprising the length times a combined depth of the first edge plate, second edge plate and the set of layers is larger than an edge area comprising the length times the width of the one or more sets of layers.

9. The method of claim 8, wherein the cathode current collector layer is between two cathode material layers.

10. The method of claim 8, wherein the anode current collector layer is between two lithium-metal layers.

11. The method of claim 8, wherein the one or more sets of layers further comprise at least two sets of layers with an additional separator between the layers.

12. The method of claim 8, wherein the one or more sets of layers further comprise at least two sets of layers, wherein the layer order is:
   a first cathode set of layers comprising: a first cathode material layer, a first cathode current collector layer, a second cathode material layer;
   a first separator layer, a first anode set of layers comprising: a first lithium-metal layer, a first anode current collector layer, a second lithium-metal layer;
a second separator layer;
a second cathode set of layers;
a third separator layer; and
a second anode set of layers.

13. The method of claim 8, further comprising inserting the set of layers, first edge plate and second plate within a battery body.

14. The method of claim 13, further comprising disposing an electrolyte in the battery body.

15. The method of claim 8, further comprising placing one or more bands around the compressed layers, first edge plate and the second edge plate.

16. The method of claim 8, wherein the one or more sets of layers further comprise alternating cathode layer sets and anode layer sets, the cathode layer sets comprising the cathode current collector layer between cathode material layers, and the anode layer sets comprising the anode current collector layer between lithium-metal layers.

17. A computing device comprising:
a processor mounted on a substrate;
a memory unit capable of storing data;
a graphics processing unit;
an antenna within the computing device;
a display on the computing device;
a battery within the computing device;
a power amplifier within the processor; and
a voltage regulator within the processor;
wherein the battery comprises:
   a battery body having a length, width and depth, wherein the depth is larger than the length and width;
   a first edge plate having substantially the length and substantially the width;
   a second edge plate having substantially the length and substantially the width; and
   one or more sets of strips compressed with pressure between the first edge plate and the second edge plate, the sets of strips having substantially the length and substantially the width, a set of strips from the one or more sets of strips comprising:
      a cathode current collector strip;
      a cathode material strip coupled to the cathode current collector strip;
      an anode current collector strip;
      a lithium-metal strip coupled to the anode current collector strip and comprising lithium metal; and
      a separator strip disposed between the lithium-metal strip and the cathode material strip and configured to insulate the cathode material strip from the lithium-metal strip,
   wherein a side area comprising the length times a combined depth of the first edge plate, second edge plate and the set of strips is larger than an edge area of the length times the width of the one or more sets of strips, and
   wherein the first edge plate, second edge plate and one or more sets of strips are inserted within the battery body.

18. The computing device of claim 17, further comprising a charging sensor.

19. The computing device of claim 17, further comprising an anode collector bus coupled to the anode current collector strip.

20. The computing device of claim 19, wherein the anode collector bus is coupled to a negative terminal.

21. The computing device of claim 17, further comprising a cathode collector bus coupled to the cathode current collector strip.

22. The computing device of claim 21, wherein the cathode collector bus is coupled to a negative terminal.

23. The computing device of claim 17, wherein the battery has flat edges and sides.

* * * * *